United States Patent
Porte et al.

(10) Patent No.: US 8,650,853 B2
(45) Date of Patent: Feb. 18, 2014

(54) NOISE REDUCTION ASSEMBLY FOR AIRCRAFT TURBOJET

(75) Inventors: Alain Porte, Colomiers (FR); Jacques Lalane, Saint Orens (FR)

(73) Assignee: Airbus Operations S.A.S., Toulouse (FR)

( * ) Notice: Subject to any disclaimer, the term of this patent is extended or adjusted under 35 U.S.C. 154(b) by 730 days.

(21) Appl. No.: 12/112,616

(22) Filed: Apr. 30, 2008

(65) Prior Publication Data

US 2008/0206044 A1    Aug. 28, 2008

Related U.S. Application Data

(62) Division of application No. 11/102,713, filed on Apr. 11, 2005, now abandoned.

(30) Foreign Application Priority Data

Apr. 27, 2004    (FR) ...................................... 04 50794

(51) Int. Cl.
  *F02C 7/045*    (2006.01)
  *B64D 33/02*    (2006.01)
  *F02K 3/04*    (2006.01)

(52) U.S. Cl.
  USPC ............................. 60/226.1; 181/214; 415/119

(58) Field of Classification Search
  USPC ............... 60/226.1; 415/9, 119; 181/213, 214
  See application file for complete search history.

(56) References Cited

U.S. PATENT DOCUMENTS

| | | | |
|---|---|---|---|
| 4,293,053 A | | 10/1981 | Shuttleworth et al. |
| 4,940,386 A | | 7/1990 | Feuvrier et al. |
| 5,259,724 A | * | 11/1993 | Liston et al. .................. 415/119 |
| 5,344,280 A | * | 9/1994 | Langenbrunner et al. ........ 415/9 |
| 6,123,170 A | | 9/2000 | Porte et al. |
| 6,371,721 B1 | | 4/2002 | Sathianathan et al. |
| 6,761,245 B2 | * | 7/2004 | Porte ............................. 181/214 |
| 2004/0007422 A1 | | 1/2004 | Porte et al. |
| 2004/0031878 A1 | * | 2/2004 | Linton ............................ 244/10 |
| 2004/0094359 A1 | | 5/2004 | Porte et al. |
| 2005/0082112 A1 | * | 4/2005 | Harrison ....................... 181/214 |

FOREIGN PATENT DOCUMENTS

| | | |
|---|---|---|
| FR | 2 474 099 | 7/1981 |
| FR | 2 610 673 | 8/1988 |
| FR | 2 767 560 | 2/1999 |

* cited by examiner

*Primary Examiner* — Ted Kim
(74) *Attorney, Agent, or Firm* — Oblon, Spivak, McClelland, Maier & Neustadt, L.L.P.

(57) ABSTRACT

A noise reduction assembly located at a junction plane between an air intake structure and a fan casing of an aircraft turbojet has improved acoustic properties since the alternation of acoustic and non-acoustic zones is displaced or eliminated. In particular, the inner wall of the air intake structure includes a projecting part that extends towards the aft direction beyond the junction plane, in other words the flange of the fan casing. The projecting part may be sufficiently long so that its inner skin is continuous as far as the limit between the acoustic zone and the non-acoustic zone of the nacelle.

10 Claims, 5 Drawing Sheets

NOISE REDUCTION ASSEMBLY FOR AIRCRAFT TURBOJET

This application is a divisional of and claims the benefit of priority under 35 USC §120 from U.S. Ser. No. 11/102,713, filed Apr. 11, 2005, now abandoned, the entire contents of which is incorporated herein by reference, and is based upon and claims the benefit of priority under 35 USC §119 from the French Patent Application No. 04-50794, filed Apr. 27, 2004.

BACKGROUND OF THE INVENTION

1. Technical field

This invention relates to a noise reduction assembly for an aircraft engine that can be installed on any turbojet equipped with a fan placed inside a nacelle surrounding the engine.

The noise reduction assembly comprises an air intake structure and an annular part that connects the air intake structure onto a fan casing; it may be fixed to the fan casing.

2. Background Art

FIG. 1 very diagrammatically shows a double stream turbojet with a conventional design including a central engine 1 centred on a longitudinal axis, in which the end that is intended to face forwards is located at the left of the figure. By convention, the terms "forward" and "aft" are used throughout this text with reference to the forward and aft side of the engine.

Starting from its forward end, as known, the central engine 1 comprises a compressor, a high pressure turbine driving the compressor, a combustion chamber and a low pressure turbine that in turn drives a fan located forward from the central engine 1. The blades 2 of the fan are located in an annular duct 3 called the "fan duct", delimited between the outer skin of the central engine 1 and the inner skin of a nacelle 4, arranged coaxially around the central engine 1. By convention, if not mentioned otherwise, the terms "inner" and "outer" are used to denote the position or the orientation of parts with respect to the fan duct 3.

The forward part of the nacelle 4 forms an air intake structure 5 in which the leading edge is streamlined and the aft end is fixed to the forward end of a fan casing 6 arranged around the fan. The fan casing 6 is mechanically and rigidly connected to the structure of the central engine 1 through at least one assembly of arms 7 arranged radially so as to have the best possible control over the existing clearance between the casing 6 and the ends of the blades of the fan 2.

The junction zone between the aft end of the inner wall 8 of the air intake structure 5 and the forward end of the fan casing 6 is shown in more detail in FIG. 2a.

Noise reduction is one of the priority objectives in the design of turbojets and consequently, it is normal practice to make part of the inner wall of the nacelle 4 in the form of a cellular noise reduction structure: this applies at least partly to the inner wall of the air intake structure 5 and the fan casing 6. Thus, in conventional turbojets, the inner wall 8 of the air intake structure 5 has a cellular sandwich type noise reduction structure away from the zone in which the junction is made, composed of an inner skin 9 permeable to air, an outer skin 10 impermeable to air, and a cellular core 11 inserted between the skins.

For example, the inner skin 9 is made in the form of a perforated plate or a fabric with holes in it made of a material such as carbon or a metal. The outer skin 10 is usually a multilayer composite structure that acts as an acoustic reflector and transmits most of the forces. Finally, the cellular core 11 is usually of the honeycomb type formed from large cells.

The fan casing 6 is usually a metallic part, preferably hollowed out, at least over part of its length, so that a noise reduction structure 12 can be fitted on its inner surface. The structure 12 is then formed mainly from a cellular structure with an inner skin 13 permeable to air on its side facing the fan channel 3.

In order to enable assembly of the air intake structure 5 and the fan casing 6, the fan casing is fitted with an annular outer flange 14 at its forward end. The assembly is made by an annular connection part 15 with an L-shaped section installed around the aft end of the inner wall 8 and fixed to the flange 14 by bolts 16 distributed around the circumference.

In turbojets according to prior art, the connection between the annular connection part 15 and the inner wall 8 of the air intake structure is made by attachment devices such as countersunk screws or rivets (diagrammatically represented by chain dotted lines in FIG. 2), that pass through the aft end of the inner wall 8.

To take account of the fact that most forces transmitted between the central engine 1 and the air intake structure 5 pass through this connection, the structure of the aft part of the inner wall 8 is modified in this zone to be reinforced. Thus, the aft part of the inner wall 8 on which the annular connection part 15 is fixed, has a reinforced inner skin 9' impermeable to air, an outer skin 10' also reinforced, and a reinforced cellular core 11', usually metallic (aluminium) and very dense formed from small cells, often filled with resin so as to resist attachment device crushing forces.

The first consequence of this technique is a complete loss of the noise reduction effect in the splicing zone. It also results in an increase of the mass in the junction zone, risks of corrosion of the metallic cellular core 11', difficulties in manufacturing (bending of small cells, machining of the shape of the cellular core), difficulties in placing attachment devices through the cellular core 11' and risks of the aft part of the wall 8 collapsing under load when the attachment devices are put into place.

Finally, the outer dimensions of the inner wall 8 are not very precise due to the fact that it is usually made by successive lay-ups on a mandrel that has the same shape as the inside of the air intake structure 5. Therefore before the annular connection part 15 is fixed onto the aft end of the wall 8, this outer surface has to be remachined and an annular shim 17 has to be inserted.

An improvement to the existing element has been described in document FR-A-2 767 560, and is illustrated in FIG. 2b. In this improvement the aft part of the inner wall 8 used to make the junction with the fan casing 6 does not have a cellular core, the inner skin 9 being applied onto the outer skin 10. Consequently, an annular space is released inside the aft part of the inner wall 8, that is used to house an extension in the forward direction of the cellular noise reduction structure 12, 13 fitted on the inside of the fan casing 6.

However, this element does not correct all disadvantages mentioned above. The characteristics of the sandwich acoustic treatment structure (inner skin, cellular core, outer skin) are specific to the specific features of the acoustic wave to be attenuated. The reduction in the height of cells in the cellular core 12 at the extension in the forward direction causes a difference with respect to the wave to be attenuated. Moreover, an acoustic discontinuity is created by the presence of the junction surface between the two noise reduction structures 9-11 and 12-13, comparable to a weak splice and that causes a loss of acoustic performances.

PRESENTATION OF THE INVENTION

The invention is intended to overcome disadvantages related to the junction of acoustic zones in turbojet nacelles.

The purpose of the invention is a noise reduction assembly including an air intake structure such that its attachment to a fan casing of an aircraft turbojet also reduces noise at the junction between the two elements.

According to one of its aspects, the invention proposes a noise reduction assembly including an annular connection part between the air intake structure and the fan casing, and an air intake structure for which the acoustically treated inner wall projects in the aft side of the engine from the junction plane of this connection part. Thus, the inner wall of the air intake structure can form part or all of the acoustic zone of the turbojet nacelle. In other words, the inner wall is composed of a sound wave attenuation structure that extends beyond the air intake structure itself towards the fan, or even as far as the normal level at which the treatment of the nacelle is no longer necessary for noise reduction, thus eliminating any discontinuity of the acoustic zone on the inner wall of the nacelle.

Conventionally, the sound wave attenuation structure of the inner wall may be provided with a cellular noise reduction core.

Advantageously, the noise reduction assembly is coupled to a fan casing fitted with an annular flange fixed to the annular connection part.

The annular connection part includes a first part that will be fixed to the flange of the casing, and a second part that will be fixed to the inner wall of the air intake structure. The attachment may be removable, for example made by rivets, or the second part may be integrated into the inner wall, for example made of carbon plies. Preferably, the two parts form an L-shaped section. The annular connection part may be fitted with centring parts at the air intake structure.

In one embodiment, the annular part is installed in an usual manner, in other words the first part is fixed on the casing flange furthest along the aft direction, and the second part is oriented upwards and is fixed between the forward part of the air intake structure and the contact zone, or projection, of the first part on the inner wall.

It is also possible to reverse this geometry and to orient and fix the second portion of the annular part on the portion of the inner wall that extends in the aft direction beyond the air intake structure towards the fan casing. In this case, the inner wall is advantageously shaped so as to facilitate the attachment between the wall and the second part of the annular part. To achieve this, the inner wall for example comprises a recess at its aft end so that the two faces of an outer part of the inner wall are accessible.

Advantageously, the aft end of the inner wall that faces towards the fan casing is reinforced to take account of the problem of a possible breakage of a fan blade.

It is possible to modify the aft end of the inner wall structure, in other words the projecting part, by a reinforcement of the attenuation structure of the sound wave, particularly the cellular core, or by the presence of a stiffener element. The acoustic structure may also be shortened.

BRIEF DESCRIPTION OF THE FIGURES

The appended figures can help to better understand the invention, but they are only given for guidance and are in no way restrictive.

DETAILED PRESENTATION OF PARTICULAR EMBODIMENTS

Figure 3:
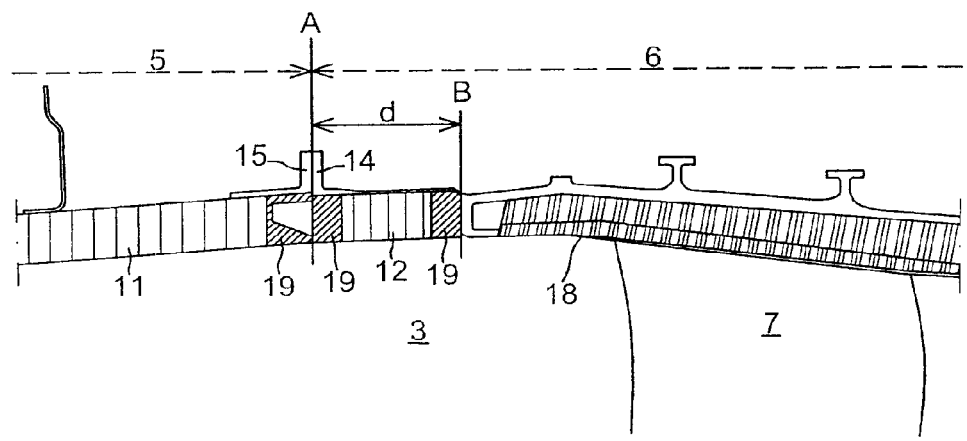
FIG. 3 illustrates acoustic zones for an engine nacelle according to the state of the art.

As shown diagrammatically in FIG. 3, the air intake structure 5 in an aircraft engine nacelle 4 is joined to the fan casing 6 by an attachment, for example by bolts, between the annular connection part 15 and flange 14: the plane A thus defined separates the "air intake structure" entity 5 and the "fan casing" entity 6. Furthermore, there is no longer any need for the inner wall 18 of the nacelle 4 to be treated to attenuate noise towards the aft end of the fan duct 3. However, the separation between the acoustic zone (at the forward end of the fan duct 3) and the non-acoustic zone 18 is made elsewhere than at the junction A: the limit B between these zones is slightly forward from the structural arms 7, but in the aft direction at a distance d from the junction A.

Consequently, regardless of the solution selected according to the state of the art for the assembly of the air intake structure 5 and the fan casing 6, within the zone in which the acoustic treatment is required (forward from B), there are zones 19 in which the inner wall is not "acoustic", in other words is not noise reducing, such as particularly all junctions between different cellular cores. A sequence of acoustic zones 11, 12 and non-acoustic zones 19 reduces the efficiency of the global acoustic treatment: regardless of the quality of the acoustic treatment of the air intake 5, the global quality of the acoustic treatment of the air intake structure 5/fan casing 6 assembly is changed as a result of the alternation of acoustic and non-acoustic zones.

According to the invention, it is proposed to reduce noise in the intermediate zone d, particularly to eliminate the alternation between acoustic and non-acoustic zones. Consequently, according to one preferred embodiment of the invention, the aft part of the inner wall 8 of the air intake structure 5 used to make the junction with the fan casing 6 extends towards the fan casing 6 as far as the limit B of the acoustic zone. It is clear that the level of the junction plane A between the air intake structure 5 and the fan casing 6 itself is determined by mechanical parameters and is not modified.

Figure 4A:
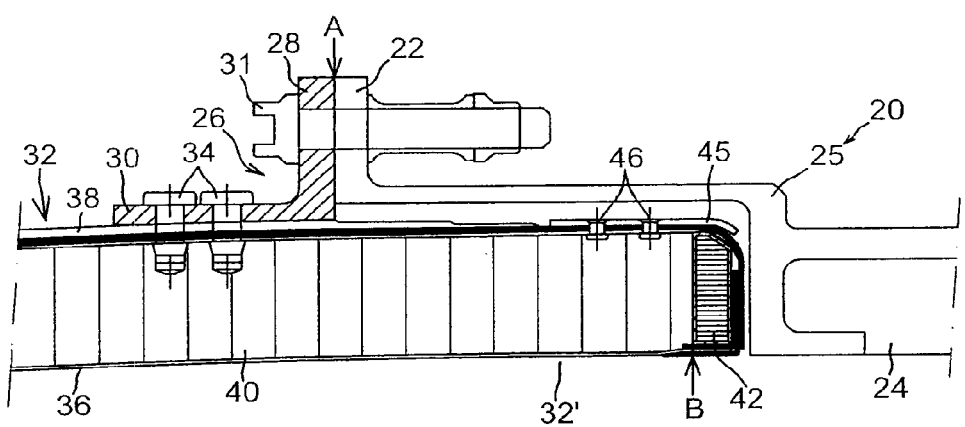
FIGS. 4a and 4b show example embodiments of the noise reduction element according to the invention.
Figure 4B:
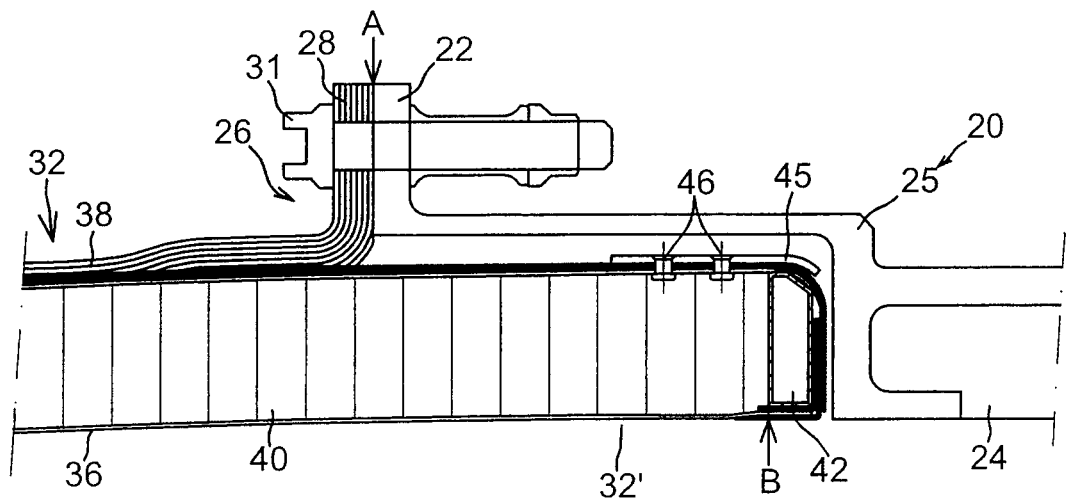
Figure 5:
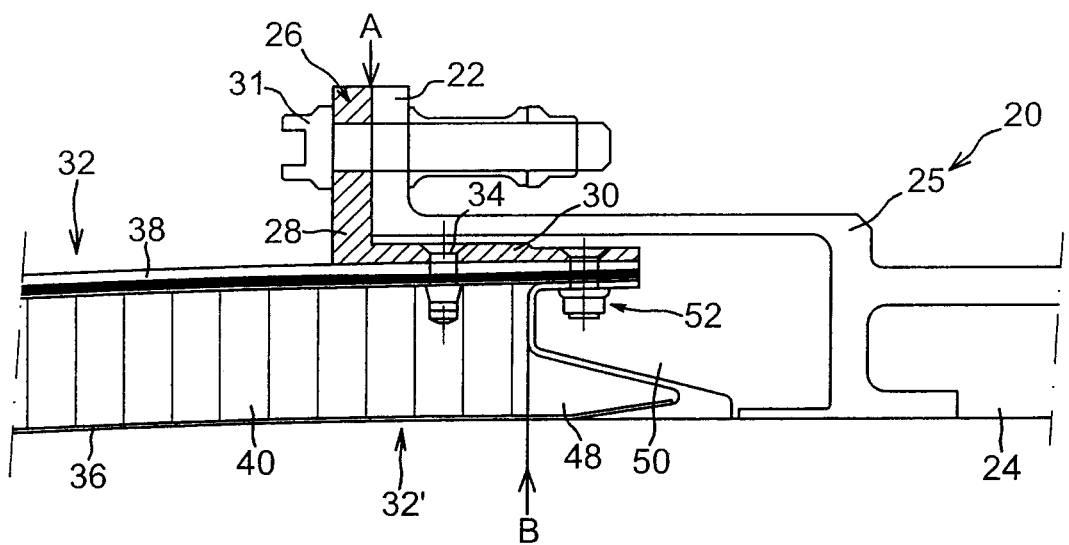
FIG. 5 shows one embodiment of the invention.
Figure 6:
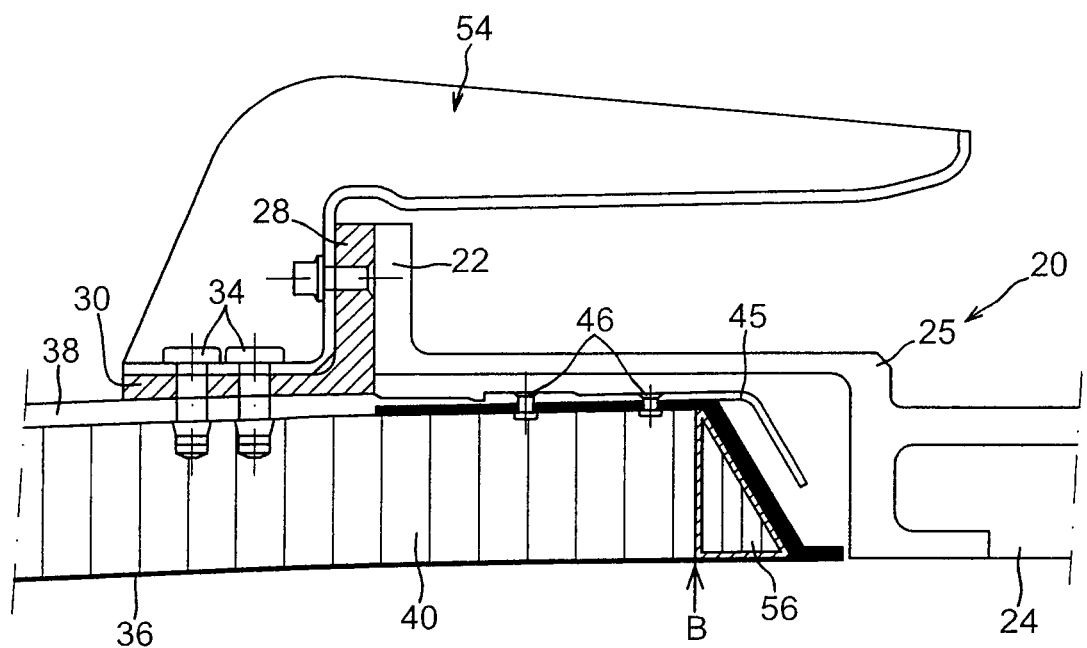
FIG. 6 shows another embodiment of the invention.

FIGS. 4 to 6 show different embodiments of the invention.

Figure 2A:
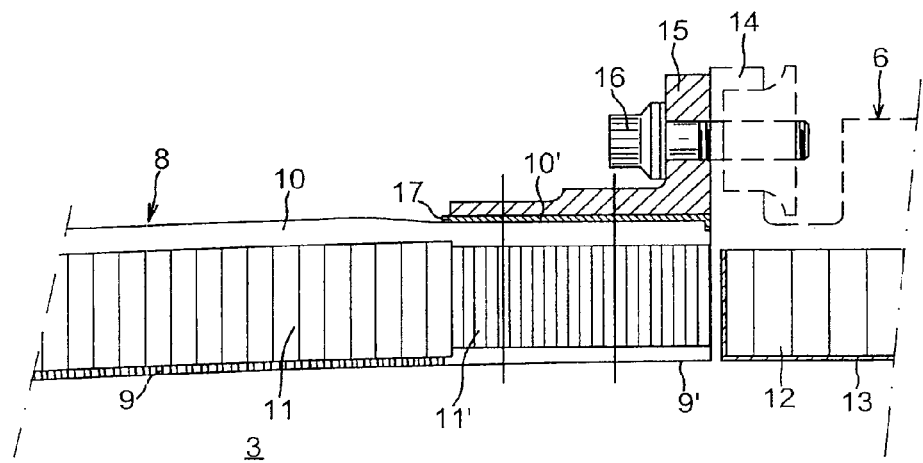
FIGS. 2a and 2b, already described, illustrate the junction zone between the air intake structure and the fan casing according to the state of the art, at a larger scale.
Figure 2B:
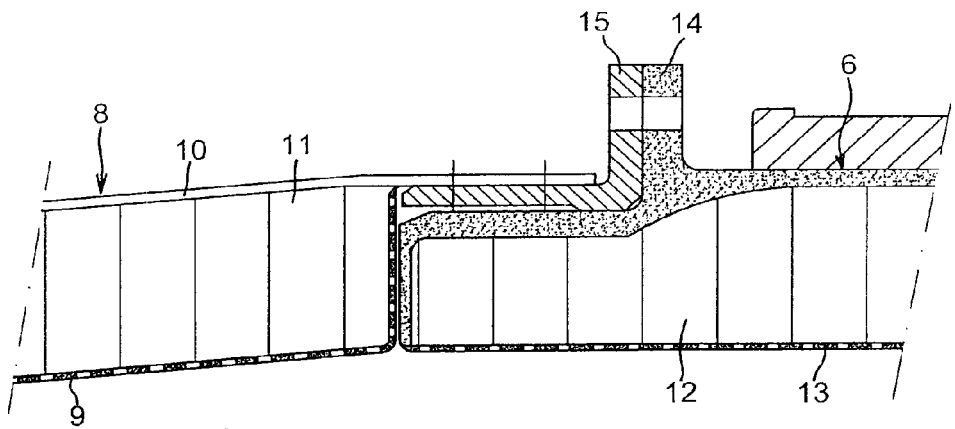

In FIG. 4a, the fan casing 20 comprises a connection flange 22 at its forward end. The inner wall 24 of the fan casing 20 is set back in the aft direction from the connection flange 22 so that once it is installed, it is located in a "non-acoustic" zone of the nacelle and therefore is not acoustically treated in this case. This embodiment is preferred, but it is possible that the inner wall 24 of the casing extends forwards from the limit B, in which case it may have a noise reduction insert in a known manner (FIG. 2a). In both cases, the connection flange 22 is connected to the forward end of the inner wall 24 through a shell 25 made in one piece with the flange 22 and the inner wall 24.

The connection flange 22 is connected to an annular connection part 26 at the junction plane A, by any known means such as bolts. Advantageously and in a known manner, the annular connection part 26 comprises a first connection portion 28 forming a flange and extending along a radial direction, and a second tubular connection portion 30 with an approximately cylindrical shape extending along the longitudinal direction of the engine 1, such that the longitudinal section of the connection part 26 is in an L shape. These shapes are preferred and may be modified as a function of assembly and manufacturing constraints.

The first connection portion will be fixed to the connection flange 22, for example using bolts 31.

The second connection portion 30 will be fixed to the inner wall 32 of the air intake structure. The assembly may be made using known methods, for example using blind rivets 34 that may pass through only part of the inner wall 32. It is also possible (see FIG. 4b) for the second connection portion 30 to be integrated into the inner wall 32. In this respect, the annular part 26 may for example be made of carbon plies. Although the design is more complex, this has the advantage of eliminating the attachments 34 that modify the acoustic quality of the structure of the wall 32, as will be described later.

The inner wall 32 is treated conventionally to form an acoustic sound wave attenuation structure. It may comprise an inner skin 36 permeable to air, an outer skin 38 impermeable to air, and a cellular core 40; other solutions could be considered, such as replacement of the cellular structure by porous foam or microspheres. The inner wall 32 extends towards the aft direction from the junction plane A, in other words it includes a projecting part 32' that extends towards the aft direction from the radial projection of the first part 28 of the connection part 26 onto the outer skin 38, on the inside of the shell 25.

Advantageously, as shown, the projecting part 32' of the inner wall 32 is sufficiently long so that the noise reduction structure 36, 38, 40 covers the distance separating the junction plane A between the air intake structure and the fan casing with no discontinuity, and the limit B between the acoustic zone and the non-acoustic zone of the fan duct. In this way, the alternation between acoustic zones and non-acoustic zones is eliminated on the inner wall of the engine nacelle. Furthermore, advantageously, the thickness of the cellular core 40 (or the sound wave attenuation structure regardless of its type) is not modified anywhere along the inner wall 32, and therefore along the projecting part 32'. The same is true for the size of cells in the cellular core, such that the cellular core is optimised for the acoustic wave to be attenuated over the entire surface.

An end part 42 may be provided at the aft end of the inner wall 24 to profile the inner skin 36 and the outer skin 38; it then makes the junction with the inner wall 24 of the fan casing 22. This end part 42 may be reinforced; however this is not essential and it may be eliminated, a change to the profile of the end of the cellular core 40 can then be recommended depending on noise reduction constraints (see FIG. 4b).

Figure 1:
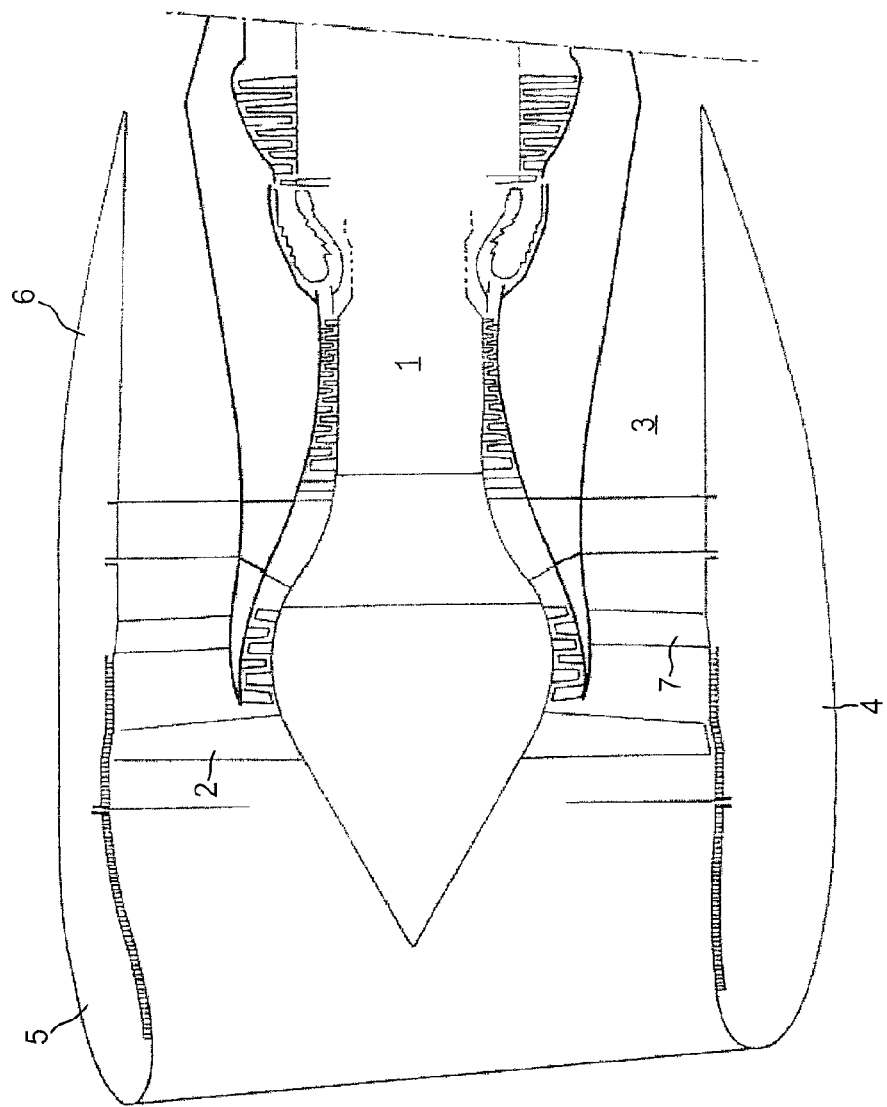
FIG. 1 described above diagrammatically represents a longitudinal sectional view of a conventional double stream turbojet.

The inner wall 32 can be reinforced in the critical region, to take account of the problem of a broken fan blade in the acoustic zone (see FIG. 1). One example of such a region is the aft end of the acoustic zone. Known stiffener elements 45 may thus be added onto the portion of the projecting part 32', for example at its aft end: see FIG. 4b. The projecting part of the inner wall 32 can also be shortened.

As described above, when the inner wall 32 of the air intake structure is not integrated, it is fixed to the first part 30 of the connection part 26 by usual means, usually blind rivets 34. Due to the presence of the projecting part 32', which may be large depending on the engine size, and the cantilever thus formed, it may be desirable to reinforce the outer skin of the projecting part 32', at least close to its end. This can be done by fixing an annular stiffener part 45 to the outer skin 38 using blind rivets 46, that may be smaller and weaker than the rivets 34.

The presence of blind rivets 34 (and accessorily 46) in the inner wall 32 changes the acoustic attenuation. If the global quality has not changed very much and performances are better than performances possible with the state of the art, it is possible to modify the layout of parts to further reduce changes to properties of the noise reduction structure 36, 38, 40, while not necessarily modifying the structure of the connection part 26.

FIG. 5 shows an embodiment of the invention in which the connection part 26 between the air intake structure and the connection flange 22 is "reversed". In this illustrated example, the connection part 26 still comprises a first portion 28 that will be fixed to the flange 22, and a second portion 30 that will be fixed to the inner wall 32. The section of the part 26 in this case is L shaped, although variants are possible, as before.

However, the second portion 30 of the connection part 26 is oriented towards the aft direction in this embodiment, and is fixed to the inner wall 32 on the aft side of the junction plane A. Thus, this avoids the cantilever, and there is no longer any need for additional reinforcement elements in some cases such as the stiffener part 45. Furthermore, as illustrated, it will be possible (although not necessary) to increase the length of the first portion 30 of the connection part 26 and the projecting part 321 so as to go beyond the limit B between the acoustic zone and the non-acoustic zone. This preferred mode means that at least part of the attachment means between the connection part 26 and the inner wall 32 may be located in a zone 48 with no acoustic treatment of the projecting part 32'. Therefore the cellular core 40, or more generally the sound wave attenuation structure, is not modified or is only slightly modified, and only by the rivets 34 when they are used, over the entire length of the acoustic zone.

Advantageously and as illustrated in FIG. 5, in this case it is possible to create an annular recess or several recesses distributed around the circumference 50 in the aft end of the projecting part 32' of the inner wall 32: this type of recess 50 enables at least part of the attachment means between the connection part 26 and the inner wall 32 to be accessible from both sides, which facilitates assembly and disassembly. Bolts 52 can thus be used at the aft end of the inner wall 32 at which the recess 50 is created.

Furthermore, and regardless of the embodiment, it is advantageous to provide the connection part 26 with at least one centring portion 54, as illustrated in FIG. 6. The centring portions extend towards the aft direction outside the first part 28, beyond the junction plane A. The centring portions 54 are placed around the flange 22 so as to centre the air intake structure with respect to the fan casing 20.

Obviously, combinations between the various elements other than those shown specifically in the figures are possible. Furthermore, known alternatives to the geometry of the different parts are included in assemblies according to the invention. Thus, for example as illustrated in FIG. 6, it is possible to replace the end part 42 of the inner wall 32 shown in FIG. 4a by a reinforced acoustic structure 56 comprising a cellular core and inner and outer skins. This alternative could also be envisaged towards the aft direction from the limit B, which consequently extends the acoustic zone beyond common requirements. Similarly, the connection part 26 may be made either from a one-piece annular part, or from several parts in the shape of an arc of a circle spliced to each other or to an independent part, depending on the case.

The invention claimed is:

1. A noise reduction assembly for a turbojet, comprising:
an air intake structure fitted with an inner wall with a sound wave attenuation structure of a constant thickness;
a fan casing positioned in an aft direction relative to the air intake structure; and an annular connection part including a first connection part fixed to an engine casing flange attached to the fan casing, and a second tubular connection part fixed on the inner wall, wherein the second tubular connection part is fixed to the inner wall by a fixing part that passes through a hole in the second tubular connection part and through a hole in an outer skin of the inner wall, wherein the second tubular connection part is fixed to the inner wall such that the inner wall includes a projecting part that includes the sound wave attenuation structure of the constant thickness and that is an integral part of the inner wall, the projecting part extending towards the aft direction from a radial projection of the first connection part on the inner wall to an aft end of the inner wall, and wherein a portion of the projecting part is reinforced by an annular stiffener structure that is disposed in the aft direction relative to an interface between the first connection part and the engine casing flange and disposed in a space formed between the outer skin of the inner wall and the engine casing flange.

2. A noise reduction assembly according to claim 1, wherein the inner wall includes an inner skin permeable to air, the outer skin which is impermeable to air, and a cellular core that forms the sound wave attenuation structure.

3. A noise reduction assembly according to claim 2, wherein the cellular core of the inner wall has a constant thickness.

4. A noise reduction assembly according to claim 2, wherein the cellular core of the inner wall extends towards the aft end of the projecting part.

5. A noise reduction assembly according to claim 1, wherein the aft end of the projecting part includes a reinforced acoustic structure.

6. A noise reduction assembly according to claim 1, wherein said first connection part is fixed to said engine casing flange, said second connection part is fixed to said inner wall, and the second connection portion of the annular connection part covers said sound attenuation structure of the inner wall.

7. A noise reduction assembly according to claim 1, wherein the annular connection part also comprises at least one centering part.

8. A noise reduction assembly according to claim 1, wherein the fan casing is fitted with the engine casing flange at a forward end thereof and fixed to the first connection part through the engine casing flange.

9. A turbojet, comprising the noise reduction assembly according to claim 1.

10. A according to claim 9, further comprising a centering part at the engine casing flange at a forward end of the fan casing.

* * * * *